(12) United States Patent
Navarro et al.

(10) Patent No.: US 8,869,893 B2
(45) Date of Patent: Oct. 28, 2014

(54) GRAVEL-PACKING CARRIER FLUID WITH INTERNAL BREAKER

(75) Inventors: Raul Navarro, Aberdeen (GB); Andrew G. K. Jones, Cape Town (ZA); Mark Luyster, Houston, TX (US); Robert L. Horton, Sugar Land, TX (US)

(73) Assignee: M-I L.L.C., Houston, TX (US)

( * ) Notice: Subject to any disclaimer, the term of this patent is extended or adjusted under 35 U.S.C. 154(b) by 669 days.

(21) Appl. No.: 12/666,011

(22) PCT Filed: Jun. 27, 2008

(86) PCT No.: PCT/US2008/068629
§ 371 (c)(1),
(2), (4) Date: Apr. 6, 2010

(87) PCT Pub. No.: WO2009/006326
PCT Pub. Date: Jan. 8, 2009

(65) Prior Publication Data
US 2010/0212896 A1 Aug. 26, 2010

Related U.S. Application Data

(60) Provisional application No. 60/947,602, filed on Jul. 2, 2007.

(51) Int. Cl.
*E21B 43/04* (2006.01)
*C09K 8/36* (2006.01)
*C09K 8/26* (2006.01)
*C09K 8/52* (2006.01)

(52) U.S. Cl.
CPC ... *C09K 8/26* (2013.01); *C09K 8/36* (2013.01); *C09K 8/52* (2013.01)
USPC ........................................................ 166/278

(58) Field of Classification Search
USPC .............................................. 166/305.1, 278
See application file for complete search history.

(56) References Cited

U.S. PATENT DOCUMENTS

| | | | |
|---|---|---|---|
| 5,051,212 A | 9/1991 | Culshaw et al. | |
| 5,972,868 A | 10/1999 | Athey et al. | |
| 6,218,342 B1 | 4/2001 | Patel | |
| 6,436,880 B1 | 8/2002 | Frenier | |
| 6,562,764 B1 | 5/2003 | Donaldson et al. | |
| 6,877,563 B2 | 4/2005 | Todd et al. | |
| 6,983,798 B2 * | 1/2006 | Todd | 166/282 |
| 7,021,377 B2 * | 4/2006 | Todd et al. | 166/278 |
| 7,159,658 B2 * | 1/2007 | Frost et al. | 166/300 |
| 7,939,474 B2 * | 5/2011 | Blauch et al. | 507/267 |
| 8,105,989 B2 * | 1/2012 | Svoboda et al. | 507/261 |
| 2001/0036905 A1 | 11/2001 | Parlar et al. | |
| 2005/0061504 A1 | 3/2005 | Frost et al. | |
| 2005/0139354 A1 * | 6/2005 | Salamat | 166/278 |
| 2005/0155761 A1 * | 7/2005 | Blauch et al. | 166/278 |
| 2006/0223714 A1 * | 10/2006 | Svoboda et al. | 507/203 |
| 2007/0111898 A1 * | 5/2007 | Frost et al. | 507/214 |
| 2007/0213233 A1 * | 9/2007 | Freeman et al. | 507/261 |
| 2008/0035340 A1 | 2/2008 | Welton et al. | |
| 2008/0139416 A1 * | 6/2008 | Rimassa et al. | 507/241 |
| 2008/0200354 A1 * | 8/2008 | Jones et al. | 507/244 |

FOREIGN PATENT DOCUMENTS

WO 0161148 A2 8/2001

OTHER PUBLICATIONS

Office Action issued in corresponding Eurasian Applicaiton No. 201070086 dated Jul. 4, 2011 (4 pages).
Office Action issued in corresponding Canadian Application No. 2,691,804 dated Nov. 23, 2011 (3 pages).
International Search Report from PCT/US2008/068629 dated Mar. 16, 2009 (4 pages).
Written Opinion from PCT/US2008/068629 dated Mar. 16, 2009 (6 pages).
Office Action issued in corresponding Eurasian Application No. 201070086 dated May 4, 2012 (3 pages).
Extended Search Report issued in European Applicaiton No. 08781116.2 dated Mar. 17, 2011 (5 pages).
Office Action issued in corresponding European Application No. 08781116.2 dated Oct. 17, 2011 (5 pages).
Office Action issued Aug. 24, 2012 in corresponding Candian application No. 2,691,804 (2 pages).
Communication pursuant to Article 94(3) EPC issued Jan. 28, 2013 in corresponding European application No. 08781116.2 (4 pages).
Office Action (w/English Translation) issued in corresponding Eurasian Application No. 201070086 dated Jan. 24, 2013 (4 pages).
Office Action (w/translation) issued in corresponding Eurasian Application No. 201070086 dated Sep. 4, 2013 (4 pages).
Office Action issued in counterpart Argentine Patent Application No. P 08 01 02864 dated Apr. 3, 2014 (3 pages).
Office Action issued Mar. 31, 2014 in corresponding Canadian application No. 2,691,804 (2 pages).
Correspondence reporting Office Action issued Jun. 4, 2014 in corresponding Mexican application No. MX/a/2010/000201 (5 pages).
Office Action issued in corresponding Eurasian Application No. 201070086 dated Apr. 29, 2014 (3 pages).

* cited by examiner

*Primary Examiner* — Catherine Loikith
(74) *Attorney, Agent, or Firm* — Osha Liang LLP

(57) ABSTRACT

A method of gravel packing a hole in a subterranean formation having a filter cake coated on the surface thereof that includes injecting into the hole a gravel pack composition comprising gravel and a carrier fluid comprising a base fluid and at least one iminodiacetic acid or salt thereof is disclosed.

15 Claims, No Drawings

GRAVEL-PACKING CARRIER FLUID WITH INTERNAL BREAKER

BACKGROUND OF INVENTION

1. Field of the Invention

Embodiments disclosed herein relate generally to compositions and methods used in completing a well. In particular, embodiments disclosed herein relate to compositions and methods used in gravel packing operations.

2. Background Art

During the drilling of a wellbore, various fluids are typically used in the well for a variety of functions. The fluids may be circulated through a drill pipe and drill bit into the wellbore, and then may subsequently flow upward through wellbore to the surface. Common uses for well fluids include: lubrication and cooling of drill bit cutting surfaces while drilling generally or drilling-in (i.e., drilling in a targeted petroliferous formation), transportation of "cuttings" (pieces of formation dislodged by the cutting action of the teeth on a drill bit) to the surface, controlling formation fluid pressure to prevent blowouts, maintaining well stability, suspending solids in the well, minimizing fluid loss into and stabilizing the formation through which the well is being drilled, fracturing the formation in the vicinity of the well, displacing the fluid within the well with another fluid, cleaning the well, testing the well, transmitting hydraulic horsepower to the drill bit, fluid used for emplacing a packer, abandoning the well or preparing the well for abandonment, and otherwise treating the well or the formation.

Once the well has been drilled and a hydrocarbon reservoir has been encountered, the well is ready to be completed. In the course of completing a well, it is common practice to run a string of casing into the well bore and then to run the production tubing inside the casing. At the producing interval(s) of the formation, perforations are typically created to extend through the casing string, through the cement that secures the casing string in place, and a short distance into the formation. These perforations may be created by detonating shaped charges carried in a perforating gun. The perforations created cross one or more production zones to allow production fluids to enter the interior of the wellbore.

After the well is perforated, a stimulation or sand control treatment process may be performed. Sand control processes may prevent, after the well is completed and placed in production, formation sand from unconsolidated formations being swept into the flow path along with formation fluid, which erodes production components in the flow path. Similarly, in uncased boreholes, where an open face is established across the oil or gas bearing zone, formation sand from unconsolidated formations may also be swept into the flow path along with formation fluid.

Thus, with either cased or uncased well bores, one or more sand screens may be installed in the flow path between the production tubing and the rock face in the producing reservoir. Additionally, the annulus around the screen may be packed with a relatively coarse sand or gravel into the void between the reservoir rock and the outside of the screen, so as to act as a filter to reduce the amount of line formation sand reaching the screen, to support the porous medium of the producing reservoir so that it will not collapse into the void between the reservoir rock and the outside of the screen and to seal off the annulus in the producing zone from non-producing formations. When the sand tries to move through the gravel, it is filtered and held back by the gravel and/or screen, but formation fluids continue to flow unhindered (by either the gravel or screen) into the production string.

In deep wells, reliability of the sand face completion is very important, due to the prohibitively high cost of intervention. Further, as many such wells are completed open hole and in relatively incompetent rock, gravel packing of open-hole horizontal wells is increasingly becoming a standard practice in the deep-water, sub-sea completion environment. The gravel packing process involves mixing gravel with a carrier fluid, and pumping the slurry down the tubing and through the cross-over, thereby flowing into the annulus between the screen and the wellbore. The carrier fluid in the slurry leaks off into the formation and/or through the screen. The screen is designed to prevent the gravel in the slurry from flowing through it and entering the production tubing. As a result, the gravel is deposited in the annulus around the screen where it becomes tightly packed, forming a "gravel pack." Thus, gravel is deposited adjacent an open hole where it serves to prevent sand and other formation fines from flowing into the wellbore.

Proper selection of the carrier fluid is essential to a gravel packing process. Ideally, the carrier fluid shall not cause any permeability reduction of the formation. When viscous fluids are used, carrier fluid must also have sufficient viscosity to suspend and carry the gravel during placement. Carrier fluids are either considered "water-based" or "oil-based" depending on the constituency of their external continuous phase. Aqueous-base fluids can be tailored to be compatible with most formations simply by including salts such as potassium chloride, ammonium chloride, or tetramethyl ammonium chloride. Consequently, to date, the convention in gravel-packing horizontal wells has been water packing or shunt-packing with water-based viscous fluids comprising a brine, a gelling agent such as hydroxyethylcellulose (HEC), xanthan or a viscoelastic surfactant, and breakers to minimize the pressure required to move the fluid back to the wellbore.

Accordingly, there exists a continuing need for developments in carrier fluids for gravel packing processes.

SUMMARY OF INVENTION

In one aspect, embodiments disclosed herein relate to a method of gravel packing a hole in a subterranean formation having a filter cake coated on the surface thereof that includes injecting into the hole a gravel pack composition comprising gravel and a carrier fluid comprising a base fluid and at least one iminodiacetic acid or salt thereof.

In another aspect, embodiments disclosed herein relate to a solution that includes an aqueous fluid; at least one iminodiacetic acid or a salt thereof represented by the formula

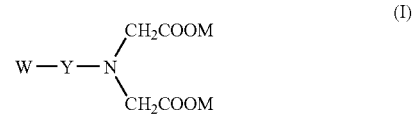

(I)

wherein the M groups each independently represents a hydrogen atom, an alkali metal atom, an ammonium group or a substituted ammonium group; Y represents a divalent alkyl group having from 1 to 7 carbon atoms and the divalent alkyl group may be substituted by a hydroxyl group or a COOM group wherein M represents a hydrogen atom, an alkali metal atom, an ammonium group or a substituted ammonium group; and W represents a hydrogen atom, a hydroxyl group or a COOM group wherein M represents a hydrogen atom, an alkali metal atom, an ammonium group or a substituted ammonium group; an acidic buffering agent; and gravel.

Other aspects and advantages of the invention will be apparent from the following description and the appended claims.

DETAILED DESCRIPTION

In one aspect, embodiments disclosed herein relate to fluids, compositions, and methods used in gravel packing operations. In particular, embodiments disclosed herein relate to methods for simultaneous gravel-packing and filter cake removal from a wellbore surface, and the gravel pack compositions used in such operations. Gravel pack compositions of the present disclosure include gravel and a carrier fluid.

Carrier Fluid

The carrier fluids of the present disclosure may include a base fluid and at least one iminodiacetic acid chelating agent and/or an acidic buffering agent. Optionally, the carrier fluid may also contain viscosifiers, weighting agents, surfactants, emulsifiers, scale inhibitors, etc. The carrier fluid may further include a weighting agent such as a high density brine containing water soluble salts of alkali and alkaline earth metals.

An illustrative carrier fluid may be formulated to include an aqueous fluid; and at least one iminodiacetic acid or a salt thereof represented by the formula

wherein the M groups each independently represents a hydrogen atom, an alkali metal atom, an ammonium group or a substituted ammonium group; Y represents a divalent alkyl group having from 1 to 7 carbon atoms and the divalent alkyl group may be substituted by a hydroxyl group or a COOM group wherein M represents a hydrogen atom, an alkali metal atom, an ammonium group or a substituted ammonium group; and W represents a hydrogen atom, a hydroxyl group or a COOM group wherein M represents a hydrogen atom, an alkali metal atom, an ammonium group or a substituted ammonium group. Use of such iminodiacetic acids (salts) is described in U.S. Patent Application Ser. No. 60/890,586, which is assigned to the present assignee and herein incorporated by reference in its entirety.

In the iminodiacetic acids (salts) represented by formula 1 of the present invention, the —COOM group is preferably a carboxyl group or an alkali metal salt or ammonium salt thereof. The alkali metal atom is sodium or potassium and preferably is sodium. Examples of groups represented by Y in formula I are set forth below.

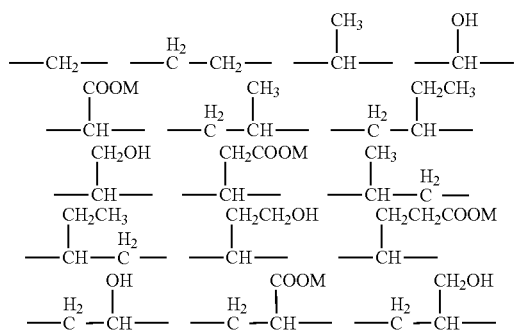

Examples of iminodiacetic acids (salts) include α-alanine-N,N-diacetic acid (salt), β-alanine-N,N-diacetic acid (salt), aspartic acid-N,N-diacetic acid (salt), glutamic acid-N,N-diacetic acid (salt), serine-N,N-diacetic acid (salt), ethanolamine-N,N-diacetic acid (salt), iminodiacetic acid (salt) and nitrilotriacetic acid (salt), among which glutamic acid-N,N-diacetic acid (salt) is preferably used in this invention. These iminodiacetic acids (salts) are compounds having a chelating ability and are considered to enhance the degradation, dispersion, dissolution or clean-up of the filter cake as a result of complexing with any free calcium ion due to a chelating action, and possess greater compatibility and solubility in a large range of base fluids. The well bore fluids of the present disclose contain one or more of these iminodiacetic acids (salts). In one embodiment, the iminodiacetic acids (salts) comprises from about 1 to 99 percent by weight of a water-based carrier fluid, and preferably from about 10 to 50 percent by weight and more preferably less than 30 percent by weight. In another embodiment, the iminodiacetic acids (salts) comprises from about 1 to about 50 weight percent of an invert emulsion-based breaker fluid, and preferably about 5 to about 25 weight percent and more preferably, less than 15 weight percent. In yet another embodiment, the iminodiacetic acids (salts) comprise up to 20 percent by volume of the carrier fluids of the present disclosure.

An acidic buffering agent may be used in some embodiments to enhance the solubility of the filtercake solids and chelated compounds that may form when using the fluids disclosed herein. Suitable acid buffing agents are those agents that can maintain the pH of the aqueous phase such that the formation of precipitates, especially precipitates of the iminodiacetic acids (salts), does not take place. In a particular embodiment, an acidic buffering agent may be selected and provided in the carrier fluid so as to maintain the pH below a predetermined value, preferably a value of about 3. For example when glutamic acid-N,N-diacetic acid (salt) is used, the pH of the aqueous phase should be maintained below a level of about 3 in order to avoid the formation of calcium glutamic acid-N,N-diacetic acid precipitate. Routine laboratory testing and observation along with consultation with the known literature properties of the iminodiacetic acids (salts) will lead one of skill in the art to a determination of this pH level for each of the iminodiacetic acids (salts) compounds disclosed. For example, the desired level of pH can be routinely determined in the laboratory prior to field use by simply titrating sufficient acid into the fluid so as to avoid formation of a precipitate. A wide variety of acidic and acid generating materials may be utilized as acidic buffering agents. Illustrative examples of such acidic buffering agents include mineral acids, such as hydrochloric acid, hydrobromic acid, nitric acid, sulfuric acid, phosphoric acid and mixtures of these, organic acids such as carboxylic acids such as formic, acetic, proprionic, butyric acids, as well as fatty acids in the C5 to C30 range, haloacetic acids, alkyl phosphonic acids, alkyl sulfonic acids and the like. In one embodiment a mixture of mineral and organic acids are utilized, preferably hydrochloric acid and formic acid. In addition compounds that hydrolyze to form acids in situ may be utilized as acid buffing agents. Illustrative examples of such compounds include hydrolyzable anhydrides of carboxylic acids, hydrolyzable esters of carboxylic acids; hydrolyzable esters of phosphonic acid, hydrolyzable esters of sulfonic acid and other similar hydrolyzable compounds that should be well known to those skilled in the art.

In one embodiment, a hydrolyzable ester is selected such that the time to achieve hydrolysis is predetermined on the known downhole conditions, such as temperature. It is well known in the art that temperature, as well as the presence of a hydroxide ion source, has a substantial impact on the rate of hydrolysis of esters. For a given acid, for example formic aid, one of skill in the art can conduct simple studies to determine the time to hydrolysis at a given temperature. It is also well known that as the length of the alcohol portion of the ester increases, the rate of hydrolysis decreases. Thus, by systematically varying the length and branching of the alcohol portion of the ester, the rate of release of the formic acid can be controlled and thus the breaking of the emulsion of an invert emulsion filter cake can be predetermined. In one preferred embodiment, the hydrolyzable ester of a carboxylic acid is a formic or acetic acid ester of a C4 to C30 alcohol, which may be mono- or polyhydric. In another embodiment the hydrolyzable ester is C1 to C6 carboxylic acid and a C2 to C30 poly alcohol including alkyl orthoesters may be used. In one embodiment, the hydrolyzable ester of the carboxylic acid comprises from about 1 to 30 volume percent of a water-based carrier fluid, and preferably from about 5 to 15 volume percent. In another embodiment, the hydrolysable ester of the carboxylic acid will comprise from about 0.5 to about 15 volume percent of an invert emulsion-based carrier fluid, and preferably, from about 1 to about 10 volume percent. However, one of ordinary skill in the art would appreciate that the preferred amount may vary, for example, on the rate of hydrolysis for the particular acid source used. In other embodiments, a buffering agent may be provided in a buffered scale inhibitor, such as ECF-979, available from M-I LLC (Houston, Tex.).

In different embodiments of the present disclosure, the gravel pack carrier fluid may be a water-in-oil emulsion, an oil-in-water emulsion or water based. Preferably the gravel pack carrier fluids may have a density that is sufficient to allow the fluid to control the well during well completion operations, since open-hole gravel packing is done almost exclusively in circulating position. Typical fluid densities for the carrier fluid are from about 8.8 ppg (pounds per gallon) up to about 19.2 ppg, more preferably about 8.8 ppg up to 14.2 ppg.

As noted above, in one embodiment the carrier fluid may be a water based fluid that may include an aqueous fluid and at least one iminodiacetic acid or salt thereof. Additionally, the water based fluid may optionally include a water soluble polar organic solvent, an acidic buffering agent such as mineral acids, organic acids, and compounds that hydrolyze to form acids in situ such as a hydrolyzable anhydrides or esters of a carboxylic acid; a viscosifying agent, a weighting agent such as a high density brine solution, scale inhibitors, corrosion inhibitors, mutual solvents and combinations of these and other commonly known agents as disclosed below. The aqueous fluid used in the water based fluids may be selected from the group including sea water, a brine containing organic and/or inorganic dissolved salts, liquids containing water-miscible organic compounds and combinations thereof and similar compounds that should be known to one of skill in the art.

Brines suitable for use as the base fluid of the carrier fluid according to various embodiments of the present disclosure may include seawater, aqueous solutions wherein the salt concentration is less than that of sea water, or aqueous solutions wherein the salt concentration is greater than that of sea water. The salinity of seawater may range from about 1 percent to about 4.2 percent salt by weight based on total volume of seawater. The solutions, depending on the source of the seawater (ranging, for example, from the seawater from the Beaufort Sea in summer, when the seawater is relatively diluted due to melting of first-year ice, to the seawater from the Arabian Sea in summer, when the seawater is relatively concentrated due to evaporation of water), typically contain metal salts, such as but not limited to, transition metal salts, alkali metal salts, alkaline earth metal salts, and mixtures thereof. Exemplary salts include halides of zinc, calcium, and mixtures thereof. For example, the solution can include zinc halide, such as zinc bromide or zinc chloride or both, optionally in combination with calcium bromide or calcium chloride or both. Salts that may be found in seawater include, but are not limited to, sodium, calcium, aluminum, magnesium, potassium, strontium, and lithium salts of chlorides, bromides, carbonates, iodides, chlorates, bromates, formates, sulfates, silicates, phosphates, nitrates, oxides, and fluorides. Salts that may be incorporated in a given brine include any one or more of those present in natural seawater or any other organic or inorganic dissolved salts. Additionally, brines that may be used in the drilling fluids disclosed herein may be natural or synthetic, with synthetic brines tending to he much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium. The brine solution can include the salts in conventional amounts, generally ranging from about 1% to about 80%, and preferably from about 20% to about 60%, based on the total weight of the solution, although as the skilled artisan will appreciate, amounts outside of this range can be used as well. In a particular embodiment, the brine may be a $CaCl_2$ and/or $CaBr_2$ brine.

Further, embodiments of the present disclosure may further use "specialty" brines that include at least one alkali metal salt of a transition metal oxy-anion or polyoxy-anion, such as, for example, an alkali metal polytungstate, an alkali metal heteropolytungstate, an alkali metal polymolybdate or an alkali metal heteropolymolybdate.

In an alternative embodiment, the carrier fluid may be an invert emulsion based fluid that may include a non-oleaginous internal phase and an oleaginous external phase. The non-oleaginous internal phase includes at least one iminodiacetic acid (or salt thereof) and may further include a water soluble polar organic solvent, an acidic buffering agent such as mineral acids, organic acids, and compounds that hydrolyze to form acids in situ such as a hydrolyzable anhydride or ester of a carboxylic acid, a weighting agent such as a high density brine solution, a viscosifying agent, and combinations of these and other commonly known agents as disclosed below. The oleaginous external phase may include an oleaginous fluid such as diesel or other suitable hydrocarbon or synthetic oil, and an emulsifier. Optionally other components may include a viscosifying agent, a wetting agent, corrosion inhibitors, scale inhibitors, cleaning solvents and other such compounds as described below and which as should be known to one of skill in the art.

The oleaginous fluid used for formulating the invert emulsion fluids used in the practice of the present invention are liquids and are more preferably a natural or synthetic oil and more preferably, the oleaginous fluid is selected from the group including diesel oil, mineral oil, synthetic oils such as ester based synthetic oils, polyolefin based synthetic oils (i.e., saturated and unsaturated polyalpha olefin, saturated and unsaturated long chain internal olefins), polydiorganosiloxanes, siloxanes or organo-siloxanes, and mixtures thereof and similar compounds that should be known to one of skill in the art. The concentration of the oleaginous fluid should be sufficient so that an invert emulsion forms and may be less than about 99% by volume of the invert emulsion. However, generally the amount of oleaginous fluid must be sufficient to form a stable emulsion when utilized as the continuous phase. In various embodiments, the amount of oleaginous fluid at least about 30 percent, preferably at least about 40 percent, and more preferably at least about 50 percent by volume of the total fluid. In one embodiment, the amount of oleaginous fluid is from about 30 to about 95 percent by volume and more preferably from about 40 to about 90 percent by volume of the invert emulsion fluid.

The non-oleaginous fluid used in the formulation of the invert emulsion based fluids is a liquid and preferably is an aqueous liquid. More preferably, the non-oleaginous fluid may be selected from the group including sea water, a brine containing organic and/or inorganic dissolved salts, liquids containing water-miscible organic compounds and combinations thereof and similar compounds that should be known to one of skill in the art. The amount of the non-oleaginous fluid is typically less than the theoretical limit needed for forming an invert emulsion. In various embodiments, the amount of non-oleaginous liquid is at least about 1, preferably at least about 5, and more preferably greater than about 10 percent by volume of the total fluid. Correspondingly, the amount of the non-oleaginous fluid should not be so great that it cannot be dispersed in the oleaginous phase. Thus, in one embodiment, the amount of non-oleaginous fluid is less than about 70% by volume and preferably from about 1% to about 70% by volume. In another embodiment, the non-oleaginous fluid is preferably from about 10% to about 60% by volume of the invert emulsion fluid.

In embodiments where a water soluble polar organic solvent is utilized, the water soluble polar organic solvent should be at least partially soluble in an oleaginous fluid, but should also have partial solubility in an aqueous fluid. The polar organic solvent component of the present invention may be a mono-hydric, di-hydric or poly-hydric alcohol or a mono-hydric, di-hydric, or poly-hydric alcohol having poly-functional groups. Examples of such compounds include aliphatic diols (i.e., glycols, 1,3-diols, 1,4-diols, etc.), aliphatic polyols (i.e., tri-ols, tetra-ols, etc.), polyglycols (i.e., polyethylenepropylene glycols, polypropylene glycol, polyethylene glycol, etc.), glycol ethers (i.e., diethylene glycol ether, triethylene glycol ether, polyethylene glycol ether, etc.) and other such similar compounds that may be found useful in the practice of the present invention. In one preferred embodiment, the water soluble organic solvent is a glycol or glycol ether, such as ethylene glycol mono-butyl ether (EGMBE). Other glycols or glycol ethers may be used in the present invention so long as they are at least partially miscible with water.

As noted above a number of other components, such as emulsifiers, viscosifiers, weighting agents, defoamers, scale inhibitors, bacteriacides, surfactants, corrosion inhibitors, wetting agents, thinners, etc. may be included in the formulation of the fluids disclosed herein. In selecting these other components, one must take into account the type of fluid being created (i.e. water-based v. invert emulsion based), the components of the filter cake that is to be removed, the downhole conditions, etc. Routine laboratory testing will provide guidance as to which components are helpful or detrimental to achieving the desired results.

Both the invert emulsion fluids and water based fluids of the present invention may further contain additional chemicals depending upon the end use of the fluid so long as they do not interfere with the functionality of the fluids described herein. For example, wetting agents, organophilic clays, viscosifiers, fluid loss control agents, surfactants, dispersants, interfacial tension reducers, pH buffers, mutual solvents, thinners, thinning agents, scale inhibition agents, corrosion inhibition agents, cleaning agents and a wide variety of the other components known to one of skill in the art may be added to the fluid compositions of this invention for additional functional properties. The addition of such agents and the reasons for doing so should be well known to one of ordinary skill in the art of formulating drilling fluids (also known as drilling muds,) completion fluids, spacer fluids, clean-up fluids, fracturing fluids, and other similar wellbore fluids.

In an illustrative embodiment, weighting agent is utilized to increase the density of the overall fluid so as to match that of the drilling fluid and to provide sufficient hydrostatic head so that the well can remain under control. Preferably a high density brine containing salts of alkali and alkaline earth metals is used to weight-up the fluids disclosed herein. For example, brines formulated with high concentrations of sodium, potassium, or calcium salts of the halides, formate, acetate, nitrate, and the like; cesium salts of formate, acetate, nitrate, and the like, as well as other compounds that should be well known to one of skill in the art, can be used as solids free weighting agents. The selection of a weighting agent may partially depend upon the desired density of the carrier fluid, as known by one of ordinary skill in the art. Other typical solid weighting agents known in the art include materials such as, for example, barium sulphate (barite), calcium carbonate (calcite), dolomite, ilmenite, hematite or other iron ores, olivine, siderite, manganese oxide, and strontium sulphate.

The emulsifier used in the formulation of the illustrative invert emulsion breaker fluid will be selected so as to form a stable invert emulsion. The selection of the emulsifier may be such that the invert emulsion breaks with time and/or upon application of heat. For example the emulsifier may be selected such that when the pH of the invert emulsion's non-oleaginous phase changes, the emulsifier's hydrophilic-lipophilic balance (HLB) value is sufficiently shifted to destabilize the invert emulsion. One of skill in the art should know that the HLB value indicates the polarity of the molecules in a range of 1 to 40 that increases with increasing hydrophilicity of the emulsifier. Given the large variety of invert emulsion emulsifiers available, one of ordinary skill in the art need only do a routine screen of emulsifiers by forming an invert emulsion to select an emulsifier suitable for use in the fluids disclosed herein. In one embodiment, an emulsifier can selected such that after forming the invert emulsion and the addition of a small amount of formic acid will result in the emulsion breaking. Preferred emulsifiers may include VERSAWET™ and VERSACOAT™, which are commercially available from M-I L.L.C., Houston, Tex. Alternatively, an amine-based acid sensitive emulsifier such as those described in U.S. Pat. Nos. 6,218,342, 6,790,811, and 6,806,233, the contents of which are incorporated by reference herein, may be used. Examples of such emulsifiers are commercially available from M-I L.L.C., Houston, Tex. under the tradename FAZE-MUL™. In a particular embodiment, such emulsifiers may be present in the carrier fluid in an amount ranging from 0.2 to 1.0 percent by volume.

The carrier fluids of the present disclosure may optionally include a visocisifiers, including natural or biopolymers in addition to synthetic polymer. Such "natural" polymers include HEC, derivatized HEC, guars, derivatized guars, starches, derivatized starches, scleroglu cans, wellan gums, locust bean gum, karaya gum, gum tragacanth, carrageenans, alginates, gum arabic, and biopolymers, such as, for example that derived from fermentation with *xanthomonas campestris*, and other similar polymers including ECF-612, which is commercially available from M-I LLC, Houston, Tex., and described in U.S. Patent Application Ser. No. 60/894,363, which is assigned to the present assignee and herein incorporated by reference in its entirety.

Further, embodiments of the present disclosure may also use a number of "synthetic" polymers, either exclusive of the aforementioned "natural" polymers or in combination therewith. "Synthetic" polymers include poly(ethylene glycol) (PEG), poly(diallyl amine), poly(acrylamide), poly(acrylonitrile), poly(vinyl acetate), poly(vinyl alcohol), poly(aminomethylpropylsulfonate[AMPS]), poly(vinyl amine), poly(vinyl sulfonate), poly(styryl sulfonate), poly(acrylate), poly (methyl acrylate), poly(methacrylate), poly(methyl methacrylate), poly(vinylpyrrolidone), poly(vinyl lactam), co-, ter-, and quater-polymers of the following co-monomers: ethylene, butadiene, isoprene, styrene, divinylbenzene, divinyl amine, 1,4-pentadiene-3-one (divinyl ketone), 1,6-heptadiene-4-one (diallyl ketone), diallyl amine, ethylene glycol, acrylamide, AMPS, acrylonitrile, vinyl acetate, vinyl alcohol, vinyl amine, vinyl sulfonate, styryl sulfonate, acrylate, methyl acrylate, methacrylate, methyl methacrylate, vinylpyrrolidone, vinyl lactam and other similar polymers.

Organophilic clays, normally amine treated clays, may be useful as viscosifiers and/or emulsion stabilizers in the fluid composition of the present invention. Other viscosifiers, such as oil soluble polymers, polyamide resins, polycarboxylic acids and soaps may also be useful. The amount of viscosifier used in the composition can vary upon the end use of the composition. However, normally about 0.1% to 6% by weight range is sufficient for most applications. VG-69™ and VG-PLUS™ and VG-Supreme are organoclay materials distributed by M-I, L.L.C., Houston, Tex., and Versa-HRP™ by a polyamide resin material manufactured and distributed by M-I, L.L.C., that may be used in this invention. Other examples of commercially available compounds include the Bentone™ line of products produced by Rheox as well as similar such materials widely known and available in the drilling fluids industry.

Wetting agents that may be suitable for use in this invention include crude tall oil, oxidized crude tall oil, surfactants, organic phosphate esters, modified imidazolines and amidoamines, alkyl aromatic sulfates and sulfonates, and the like, and combinations or derivatives of these and similar such compounds that should be well known to one of skill in the art. However, when used with the invert emulsion fluids that undergo a pH controlled phase change, the use of fatty acid wetting agents should be minimized so as to not adversely affect the reversibility of such invert emulsions as disclosed herein. Faze-Wet™, VersaCoat™, SureWet™, Versawet™ and Versawet™ NS are examples of commercially available wetting agents manufactured and distributed by M-I L.L.C. that may be used in the fluids disclosed herein. Silwet L-77, L-7001, L7605, and L-7622 are examples of commercially available surfactants and wetting agents manufactured and distributed by General Electric Company (Wilton, Conn.).

Suitable thinners that may be used in the breaker fluids disclosed herein include, for example, lignosulfonates, modified lignosulfonates, polyphosphates, tannins, and low molecular weight polyacrylates. Thinners are typically added to a drilling fluid to reduce flow resistance and control gelation tendencies. Other functions performed by thinners include reducing filtration and filter cake thickness, counteracting the effects of salts, minimizing the effects of water on the formations drilled, emulsifying oil in water, and stabilizing fluid properties at elevated temperatures.

The inclusion of cleaning agents in the fluids disclosed herein should be well known to one of skill in the art. A wide variety of synthetic and natural product derived cleaning agents may be used. For example, a common natural product derived cleaning agent is d-limonene. The cleaning ability of d-limonene in well drilling applications is disclosed in U.S. Pat. No. 4,533,487, and in combination with various specialty surfactants in U.S. Pat. No. 5,458,197, the contents of which are incorporated herein.

In a particular embodiment, a water-based carrier fluid may be prepared by adding water (up to 50 percent by volume of the final carrier fluid) to a brine (approximately 30 to 60 percent by volume), then an iminodiacetic acid (salt) (up to 20 percent by volume), an acidic buffering agent (up to 30 percent by volume), and then emulsifier (0.2 to 1 percent by volume). Optionally, a scale inhibitorujuujuujujh may be added either after the acidic buffering agent or after the emulsifier, and a viscosifier may be added prior to the acidic buffering agent.

In other embodiments, the methods used in preparing both the water-based and invert emulsion carrier fluids used in the methods of the present disclosure are not critical. Specifically, with respect to the invert emulsion fluids, conventional methods can be used to prepare the invert emulsion fluids in a manner analogous to those normally used to prepare oil-based drilling fluids. In one representative procedure, a desired quantity of oleaginous fluid, such as C16-C18 internal olefin, is mixed with the selected water in oil emulsifier, a viscosifying agent, and a wetting agent. The internal non-oleaginous phase is prepared by combining a polar organic co-solvent, an immino diacetic acid salt and a hydrolyzable ester into the selected brine with continuous mixing. An invert emulsion of the present invention is formed by vigorously agitating, mixing, or shearing the oleaginous fluid and the non-oleaginous fluid in a conventional manner to form the invert emulsion.

Use of Carrier Fluid in Wellbore

Specific techniques and conditions for pumping a gravel pack composition into a well are known to persons skilled in this field. The conditions which can be used for gravel-packing in the present invention include pressures that are above fracturing pressure, particularly in conjunction with the Alternate Path Technique, known for instance from U.S. Pat. No. 4,945,991, and according to which perforated shunts are used to provide additional pathways for the gravel pack slurry. Furthermore, certain oil based gravel pack compositions of the present invention with relatively low volume internal phases (e.g., discontinuous phases) can be used with alpha- and beta-wave packing mechanisms similar to water packing.

Further, a wellbore contains at least one aperture, which provides a fluid flow path between the wellbore and an adjacent subterranean formation. In an open hole completed well, the wellbore's open end, that is abutted to the open hole, may be the at least one aperture. Alternatively, the aperture can comprise one or more perforations in the well casing. At least a part of the formation adjacent to the aperture has a filter cake coated on it, formed by drilling the wellbore with either a water- or oil-based wellbore fluid that deposits on the formation during drilling operations and comprises residues of the drilling fluid. The filter cake may also comprise drill solids, bridging/weighting agents, surfactants, fluid loss control agents, and viscosifying agents, etc. that are residues left by the drilling fluid.

In addition to being used in the placement of gravel in a gravel packing operation, the carrier fluids of the present disclosure may also be used as a breaker fluid. Incorporation of breakers within gravel packing carrier fluids may be described, for example, in U.S. Pat. No. 6,631,764, which is herein incorporated by reference in its entirety. Breaker fluids are typically used in cleaning the filtercake from a wellbore that has been drilled with either a water-based drilling mud or an invert emulsion based drilling mud. Breaker fluid are typically circulated into the wellbore, contacting the filter cake and any residual mud present downhole, may be allowed to remain in the downhole environment until such time as the well is brought into production. The breaker fluids may also be circulated in a wellbore that is to be used as an injection well to serve the same purpose (i.e. remove the residual mud and filter cake) prior to the well being used for injection of materials (such as water surfactants, carbon dioxide, natural gas, etc . . . ) into the subterranean formation. Thus, the fluids disclosed herein may be designed to form two phases, an oil phase and a water phase, following dissolution of the filtercake which can easily produced from the wellbore upon initiation of production. Regardless of the fluid used to conduct the under-reaming operation, the fluids disclosed herein may effectively degrade the filtercake and substantially remove the residual drilling fluid from the wellbore upon initiation of production.

As an example of a commercially available oil based drilling fluid, FAZEPRO™ reservoir drilling fluid (available from M-I LLC, Houston, Tex.) is an oil-external emulsion system that can be inverted to water-external emulsion if it is exposed to pH less than about 7 or 8. When the filter cake is exposed, for example, to an acidic solution, the emulsion inverts and the solid particles therein (e.g., $CaCO_3$, barite, etc.) become water-wet and thus subject to removal through dissolution. Thus, the carrier fluids of the present disclosure comprising acidic aqueous phases may be used to pack gravel, while removing at least a portion of a filter cake that comprises residues of the FAZEPRO™ drilling fluid.

It should be appreciated that the amount of delay between the time when a breaker fluid according to the present invention is introduced to a well and the time when the fluids have had the desired effect of breaking/degrading/dispersing the filter cake may depend on several variables. One of skill in the art should appreciate that factors such as the downhole temperature, concentration of the components in the breaker fluid, pH, amount of available water, filter cake composition, etc. may all have an impact. For example downhole temperatures can vary considerably from 100° F. to over 400° F. depending upon the formation geology and downhole environment. However, one of skill in the art via trial and error testing in the lab should easily be able to determine and thus correlate downhole temperature and the time of efficacy of for a given formulation of the breaker fluids disclosed herein. With such information one can predetermine the time period necessary to shut-in a well given a specific downhole temperature and a specific formulation of the breaker fluid.

However it should also be appreciated that the breaker fluid formulation itself and thus the fluid's chemical properties may be varied so as to allow for a desirable and controllable amount of delay prior to the breaking of invert emulsion filter cake for a particular application. In one embodiment, the amount of delay for an invert emulsion filter cake to be broken with a water-based displacement fluid according to the present invention may be greater than 1 hour. In various other embodiments, the amount of delay for an invert emulsion filter cake to be broken with a water-based displacement fluid according to the present invention may be greater than 3 hours, 5 hours, or 10 hours. Thus the formulation of the fluid can be varied to achieve a predetermined break time and downhole temperature.

One of skill in the art should appreciate that in one embodiment, the amount of delay for an water based filter cake to be broken with a water based breaker fluid may be greater than 15 hours. In various other embodiments, the amount of delay for an water-based filter cake to be broken with a water based breaker fluid may be greater than 24 hours, 48 hours, or 72 hours. In second embodiment, the amount of delay for an invert emulsion filter cake to be broken with a water-based breaker fluid may be greater than 15 hours. In various other embodiments, the amount of delay for an invert emulsion filter cake to be broken with a water based breaker fluid may be greater than 24 hours, 48 hours, or 72 hours. In a third embodiment, the amount of delay for an invert emulsion filter cake to be broken with an invert emulsion displacement fluid may be greater than 15 hours. In various other embodiments, the amount of delay for an invert emulsion filter cake to be broken with an invert emulsion displacement fluid may be greater than 24 hours, 48 hours, or 72 hours.

Advantageously, embodiments of the present disclosure for a gravel pack composition that may result in simultaneous deposition of gravel at or adjacent to the open hole and removal of sufficient filter cake to establish a fluid flow path between the wellbore and the formation. This method may be useful in wellbores that are drilled with either a water- or an oil-based reservoir drilling fluid and completed open hole, particularly in horizontal boreholes. The fluids of the present disclosure has several benefits as compared to prior art gravel packing methods and carrier fluids having internal breakers, including slower acting and greater control in dissolution of the filtercake, which may allow a more uniform breaking in a longer amount of time. Further, the fluids may possess greater compatibility with brines, i.e., where previous carrier fluids containing an internal breaker were only stable in monovalent brines, higher pHs, and brines of lower weight or precipitation occurs, the fluids of the present disclosure may be stable in mono- and di-valent brines, as well as specialty brines, brines of higher weight, and low pHs.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method of gravel packing a hole in a subterranean formation having a filter cake coated on the surface thereof, comprising:
   injecting into the hole a gravel pack composition comprising gravel and a carrier fluid comprising a base fluid and at least one iminodiacetic acid or salt thereof,
   wherein the at least one iminodiacetic acid or a salt thereof is represented by the formula:

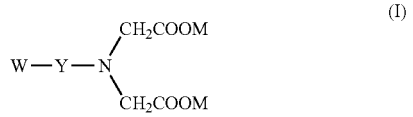

wherein Y represents a divalent alkyl group having from 2 to 7 carbon atoms and the divalent alkyl group may be substituted by a COOM group; and W represents a hydroxyl group or a COOM group, wherein the M groups each independently represent a hydrogen atom, an alkali metal atom, an ammonium group or a substituted ammonium group.

2. The method of claim 1, further comprising:
   allowing the carrier fluid to degrade at least a portion of the filter cake after a predetermined period of time.

3. The method of claim 1, further comprising:
   removing at least a portion of the filter cake.

4. The method of claim 1, wherein the wellbore has been drilled with an invert emulsion drilling mud that forms an invert emulsion filter cake, and wherein the carrier fluid is selected so that after a predetermined period of time the invert emulsion of the filter cake substantially degrades.

5. The method of claim 4, further comprising:
   removing the broken invert emulsion filter cake from the wellbore.

6. The method of claim 1, wherein the wellbore has been drilled with a water-based drilling mud that forms a water-based filter cake, and wherein the gravel pack composition is selected so that after a predetermined period of time the water-based filter cake substantially degrades.

7. The method of claim 1, further comprising:
   removing a substantially degraded filter cake from the wellbore.

8. The method of claim 1, wherein the gravel pack composition further includes an acidic buffering agent so as to maintain the pH below a value of about 3.

9. The method of claim 8, wherein acidic buffering agent is selected from the group consisting of mineral acids including hydrochloric acid, hydrobromic acid, nitric acid, sulfuric acid, phosphoric acid and mixtures of these, organic acids including carboxylic acids such as formic, acetic, proprionic, butyric acids, fatty acids in the C5 to C30 range, haloacetic acids, alkyl phosphonic acids, alkyl sulfonic acids; compounds that hydrolyze to form acids in situ including hydrolyzable anhydrides of carboxylic acids, hydrolyzable esters of carboxylic acids; hydrolyzable esters of phosphonic acid, hydrolyzable esters of sulfonic acid and combinations thereof.

10. The method of claim 8, wherein the acidic buffing agent is a hydrolyzable ester of the carboxylic acid is a formic acid ester of a C4 to C30 alcohol.

11. The method of claim 1, wherein the carrier fluid further includes a weighting agent that is a high density brine containing water soluble salts of alkali and alkaline earth metals.

12. The method of claim 1, wherein the carrier fluid further comprises an amine-based acid sensitive emulsifier.

13. The method of claim 1, wherein the carrier fluid further comprises a scale inhibitor.

14. The method of claim 1, further comprising: allowing the formation fluids to enter into the well; and producing fluids from the well.

15. The method of claim 1, wherein the at least one iminodiacetic acid or salt thereof is one or more selected from a group consisting of α-alanine-N,N-diacetic acid, β-alanine-N,N-diacetic acid, aspartic acid-N,N-diacetic acid, glutamic acid-N,N-diacetic acid, serine-N,N-diacetic acid, and salts thereof.

* * * * *